United States Patent [19]
Oda et al.

[11] Patent Number: 5,749,334
[45] Date of Patent: May 12, 1998

[54] CONTROL SYSTEM AND METHOD FOR IN-CYLINDER INJECTION INTERNAL COMBUSTION ENGINE

[75] Inventors: Hideyuki Oda; Hitoshi Kamura; Nobuaki Murakami, all of Tokyo, Japan

[73] Assignee: Mitsubishi Jidosha Kogyo Kabushiki Kaisha, Tokyo, Japan

[21] Appl. No.: 813,201

[22] Filed: Mar. 7, 1997

[30] Foreign Application Priority Data

Mar. 8, 1996 [JP] Japan .................. 8-051911
Aug. 28, 1996 [JP] Japan .................. 8-227220

[51] Int. Cl.⁶ ............................................. F02B 5/00
[52] U.S. Cl. ............................................. 123/305
[58] Field of Search .................. 123/305, 491, 123/736, 197–16, 179.19, 295, 301, 428; 360/431.05

[56] References Cited

FOREIGN PATENT DOCUMENTS

| | | | |
|---|---|---|---|
| 56-66426A | 6/1981 | Japan | 123/305 |
| 4183951A | 6/1992 | Japan | 123/305 |
| 6123245A | 5/1994 | Japan | 123/305 |
| 718375B | 3/1995 | Japan | 123/305 |
| 932651A | 2/1997 | Japan | 123/305 |

Primary Examiner—Raymond A. Nelli

[57] ABSTRACT

This invention relates to a control system and method for an in-cylinder injection internal combustion engine, which perform control of the timing of fuel injection, the timing of ignition and an EGR rate to assure the stability of combustion in the engine and also its exhaust gas cleaning performance while promoting an improvement in gas mileage by performing injection in compression strokes. The system is provided with a fuel injection valve for directly injecting fuel into a combustion chamber, a spark plug arranged in the combustion chamber, an EGR valve arranged in an EGR passage, a fuel injection timing control unit for controlling a fuel injection timing of the fuel injection valve on a basis of a preset target fuel injection timing, an ignition timing control unit for controlling an ignition timing of the spark plug on a basis of a preset target ignition timing, an exhaust gas recirculation rate control unit for controlling an opening of the EGR valve on a basis of a preset target EGR rate, and a misfire determination unit for detecting a burning fluctuation, whereby upon detection of a burning fluctuation, the target fuel injection timing, the target ignition timing and the target EGR rate are retarded or decreased.

34 Claims, 5 Drawing Sheets

FIG. 3

| | | |
|---|---|---|
| Zone 3 X$_3$ Y$_3$ | Zone 4 X$_4$ Y$_4$ | Zone 5 X$_5$ Y$_5$ |
| Zone 0 X$_0$ Y$_0$ | Zone 1 X$_1$ Y$_1$ | Zone 2 X$_2$ Y$_2$ |

Pe ↑  Ne →

RETARD ANGLE DATA OF Zone n = Xn
DECREASE ANGLE DATA OF Zone n = Yn

Pe: BRAKE MEAN EFFECTIVE PRESSURE

CONTROL SYSTEM AND METHOD FOR IN-CYLINDER INJECTION INTERNAL COMBUSTION ENGINE

BACKGROUND OF THE INVENTION a) Field of the Invention

This invention relates to a control system and method for an in-cylinder injection internal combustion engine, which perform control of the timing of fuel injection, the timing of ignition and the rate of exhaust gas recirculation.

b) Description of the Related Art

Recent developments in internal combustion engines equipped with spark plugs include engines of the type that fuel is directly injected into cylinders, that is, so-called in-cylinder injection internal combustion engines (hereinafter referred to as "in-cylinder injection engines"). It is necessary for such an in-cylinder injection engine to perform injection of fuel through each fuel injection valve (injector) at an injection timing optimal for desired combustion.

To obtain a large power output, for example, it is required to perform injection of fuel during each intake stroke (intake stroke injection mode) so that mixing of the fuel with air, which is also called "premixing", can be achieved fully to establish an optimal air/fuel ratio (stoichiometric or enriched state) throughout the interior of a cylinder. It is of course necessary to avoid fuel injection at a premature timing, because such a premature timing of fuel injection results in a strike of injected fuel against a piston so that combustion may deteriorate to adversely affect the quality of exhaust gas.

In such an intake stroke injection mode, it is also possible to perform lean burn, that is, premixing lean burn, which places more importance on gas mileage than power output. Described specifically, the profile of an intake passage and that of a top wall of a piston are set so that a flow of inducted air is guided to form a stratified vertical swirl, that is, a so-called tumble flow. The fuel injected into this tumble flow can be burned even though the overall air/fuel ratio is high since the air/fuel ratio in a vicinity of a spark plug is controlled at a level permitting relatively easy ignition.

Further, it is also contemplated to perform stratified combustion (ultralean burn) with the overall air/fuel ratio controlled at an extremely lean level. In the stratified combustion, fuel is injected in each compression stroke (compression stroke injection mode) and then guided along a curved surface on a top wall of a piston to focus the same around a spark plug instead of being premixed. The above fuel injection makes it possible to form an air-fuel mixture of a fuel-rich air/fuel ratio, which permits relatively easy ignition in a vicinity of the spark plug and an air-fuel mixture of an extremely fuel-lean air/fuel ratio in the remaining area. The above fuel injection can achieve an excellent gas mileage.

In a compression stroke injection mode of such an engine, an attempt to improve the gas mileage through optimization of the timings of injection and ignition tends to lower the stability of combustion and hence to increase NOx in exhaust gas. Further, a reduction in the EGR rate leads to improved combustion stability but has tendency to lead to an increase in the NOx in exhaust gas. Namely, it has been found through research by the present inventors that the gas mileage is in a trade-off relationship with the combustion stability and the cleanliness of exhaust gas.

The timings of injection and ignition and the EGR ratio are therefore set in an optimally matched combination in accordance with a state of operation so that the gas mileage, the combustion stability and the NOx reducibility are well balanced during normal operation. It is however considered that, depending on the use environment of the engine, the employed fuel and/or the conditions of the engine itself, the combustion stability may be reduced to cause burning fluctuations or in some instances, even misfires.

As a countermeasure for such burning fluctuations or misfires, a technique featuring retardation of the timing of fuel injection upon occurrence of a misfire has been proposed for diesel engines, for example, in Japanese Patent Publication (Kokoku) No. HEI 7-18375.

For lean burn engines of the so-called intake port injection type that each intake pipe is provided with an injector, there is a technique involving reduction (enrichment) of an air/fuel ratio upon occurrence of burning fluctuations, because the burning fluctuations can be attributed to an excessively high air/fuel ratio (in other words, an excessively lean concentration of fuel).

In any of the above-mentioned techniques, however, no reference is made to such a relationship as mentioned above between the timing of ignition and that of fuel injection in the compression stroke injection mode of an in-cylinder injection internal combustion engine. Mere application of each of the above-mentioned techniques as a countermeasure for burning fluctuations in the compression stroke injection mode of an in-cylinder injection internal combustion engine involves a problem such as occurrence of more frequent misfires due to an excessive retard.

It has also been revealed through the research of the present inventors that burning fluctuations in the compression stroke injection mode of an in-cylinder injection internal combustion engine can be attributed to smoldering which is caused by staining of a spark plug and its peripheral area with fuel. Accordingly, an attempt to reduce burning fluctuations in the compression stroke injection mode of the in-cylinder internal combustion engine by enrichment of the air/fuel ratio alone is accompanied by a problem that more smoldering tends to occur as the spark plug is stained by un-atomized fuel. None of the above-mentioned techniques make any suggestion whatsoever concerning how to balance an improvement in gas mileage, assurance of combustion stability and NOx reduction in the compression stroke injection mode of an in-cylinder injection internal combustion engine.

SUMMARY OF THE INVENTION

With the foregoing problems in view, the present invention has an object thereof the provision of a control system and method for an in-cylinder injection internal combustion engine, which in the compression stroke injection mode of the in-cylinder injection internal combustion engine, assure combustion stability and exhaust gas cleaning performance while promoting an improvement in gas mileage.

Therefore, a control system according to the present invention for an in-cylinder injection internal combustion engine—which is capable of selecting an intake stroke injection mode, in which an injection of fuel is performed primarily in an intake stroke, or a compression stroke injection mode, in which an injection of fuel is performed primarily in a compression stroke, as a fuel injection mode in accordance with a state of operation—comprises a fuel injection valve for directly injecting fuel into a combustion chamber of the internal combustion engine; a spark plug arranged in the combustion chamber to ignite an air-fuel mixture in the combustion chamber; an exhaust gas recirculation system for recirculating a portion of exhaust gas of the internal combustion engine to an intake system of the internal combustion engine; burning fluctuation detecting unit for detecting a fluctuated state of burning in the internal combustion engine; fuel injection timing control unit for controlling a fuel injection timing of the fuel injection valve on a basis of a target fuel injection timing preset corresponding to a state of operation of the internal combustion engine during normal operation of the internal combustion engine; ignition timing control unit for controlling an ignition timing of the spark plug on a basis of a target ignition timing preset corresponding to a state of operation of the internal combustion engine during normal operation of the internal combustion engine; and exhaust gas recirculation rate control unit for controlling an exhaust gas recirculation rate of the exhaust gas recirculation system on a basis of a target exhaust gas recirculation rate preset corresponding to a state of operation of the internal combustion engine during normal operation of the internal combustion engine; whereby during the compression stroke injection mode, the control system corrects at least one of the fuel injection timing, the ignition timing and the exhaust gas recirculation rate in accordance with results of a detection by the burning fluctuation detecting unit so that burning fluctuations are reduced.

Owing to the above-described features, it is possible, in the compression stroke injection mode of the in-cylinder injection internal combustion engine, to assure combustion stability while promoting an improvement in gas mileage, and hence to achieve an improvement in gas mileage, an improvement in the stability of combustion and cleaning of exhaust gas all together.

Preferably, the control system may correct at least the ignition timing and the exhaust gas recirculation rate in accordance with results of a detection by the burning fluctuation detecting unit so that burning fluctuations are reduced. This makes it possible to assure prevention of deteriorations in combustion stability and exhaust gas quality while assuring an improvement in gas mileage.

The control system may correct at least the fuel injection timing and the exhaust gas recirculation rate in accordance with results of a detection by the burning fluctuation detecting unit so that burning fluctuations are reduced. This makes it possible to assure prevention of deteriorations in combustion stability and exhaust gas quality while assuring an improvement in gas mileage.

The control system may correct at least the fuel injection timing and the ignition timing in accordance with results of a detection by the burning fluctuation detecting unit so that burning fluctuations are reduced. This makes it possible to assure combustion stability while promoting an improvement in gas mileage, and hence to achieve both an improvement in gas mileage, an improvement in the stability of combustion and cleaning of exhaust gas at high levels.

Preferably, the control system may correct the fuel injection timing, the ignition timing and the exhaust gas recirculation rate in accordance with results of a detection by the burning fluctuation detecting unit so that burning fluctuations are reduced. This makes it possible to assure combustion stability while promoting an improvement in gas mileage, and hence to achieve both an improvement in gas mileage, an improvement in combustion stability and cleaning of exhaust gas all together at extremely high levels.

Upon detection of a burning fluctuation by the burning fluctuation detecting unit, the control system may preferably retards the fuel injection timing by a first predetermined angle so that burning fluctuations are reduced. Upon detection of a burning fluctuation by the burning fluctuation detecting unit, the control system may preferably retard the ignition timing by a second predetermined angle so that burning fluctuations are reduced. Further, upon detection of a burning fluctuation by the burning fluctuation detecting unit, the control system may preferably decrease the exhaust gas recirculation rate by a predetermined amount so that burning fluctuations are reduced. This makes it possible to assure combustion stability while promoting an improvement in gas mileage, and hence to achieve an improvement in gas mileage, an improvement in combustion stability and cleaning of exhaust gas all together at extremely high levels and further to simplify the logic of the control.

When burning fluctuations are not reduced despite the correction, the control system may preferably switch the fuel injection mode from the compression stroke injection mode to the intake stroke injection mode. This makes it possible to surely stabilize combustion even when the combustion cannot be stabilized in the compression stroke injection mode.

Preferably, the control system may further comprise air/fuel ratio control unit for controlling operation of the fuel injection valve on a basis of a preset target air/fuel ratio; and during the intake stroke injection mode, the air/fuel ratio control unit may correct the target air/fuel ratio in accordance with results of a detection by the burning fluctuation detecting unit. This makes it possible to perform optimal control corresponding to each fuel injection mode because in the intake stroke injection mode, an improvement in the stability of combustion is achieved by the control unit different from the unit employed in the compression stroke injection mode.

The target fuel injection timing and the target ignition timing may preferably be set at or in a vicinity of timings where a best gas mileage of the internal combustion engine is available. This makes it possible to assure combustion stability while making an improvement in gas mileage, and further to balance an improvement in gas mileage, an assurance of combustion stability and cleaning of exhaust gas at high levels.

Preferably, a correction value of the fuel injection timing and a correction value of the ignition timing may be set at substantially the same angle. This makes it possible to bring about the above-described individual effects or advantages while simplifying the logic of the control.

The first predetermined angle may preferably be set corresponding to a state of operation of the internal combustion engine. The second predetermined angle may preferably be set corresponding to a state of operation of the internal combustion engine. Further, the predetermined amount upon decreasing the exhaust gas recirculation rate may preferably be set corresponding to a state of operation of the internal combustion engine. This makes it possible to properly perform retarding control upon occurrence of a burning fluctuation so that the above-described individual effects or advantages can be brought about more surely.

Preferably, the internal combustion engine may be provided with plural cylinders; and the control system may perform the corrections of the fuel ignition timing and the ignition timing with respect to each of the cylinders. This makes it possible to independently perform specific and adequate retarding control for each cylinder upon detection of a burning fluctuation so that the above-described individual effects or advantages can be brought about more surely.

Preferably, the burning fluctuation detecting unit may detect occurrence of a misfire in the combustion chamber.

This makes it possible to detect a misfire which may impair operation of the engine, so that drivability can be prevented from deterioration.

A control method according to the present invention for an in-cylinder injection internal combustion engine—which is capable of selecting an intake stroke injection mode, in which an injection of fuel is performed primarily in an intake stroke, or a compression stroke injection mode, in which an injection of fuel is performed primarily in a compression stroke, as a fuel injection mode in accordance with a state of operation, and which comprises a fuel injection valve for directly injecting fuel into a combustion chamber of the internal combustion engine, a spark plug arranged in the combustion chamber to ignite an air-fuel mixture in the combustion chamber, an exhaust gas recirculation system for recirculating a portion of exhaust gas of the internal combustion engine to an intake system of the internal combustion engine; burning fluctuation detecting unit for detecting a fluctuated state of burning in the internal combustion engine, fuel injection timing control unit for controlling a fuel injection timing of the fuel injection valve, ignition timing control unit for controlling an ignition timing of the spark plug, and exhaust gas recirculation rate control unit for controlling an exhaust gas recirculation rate of the exhaust gas recirculation system—comprises the following steps: controlling a fuel injection timing of the fuel injection valve on a basis of a target fuel injection timing preset corresponding to a state of operation of the internal combustion engine during normal operation of the internal combustion engine; controlling an ignition timing of the spark plug on a basis of a target ignition timing preset corresponding to a state of operation of the internal combustion engine during normal operation of the internal combustion engine; controlling an exhaust gas recirculation rate of the exhaust gas recirculation system on a basis of a target exhaust gas recirculation rate preset corresponding to a state of operation of the internal combustion engine during normal operation of the internal combustion engine; and correcting at least one of the fuel injection timing, the ignition timing and the exhaust gas recirculation rate in accordance with results of a detection by the burning fluctuation detecting unit during the compression stroke injection mode. Owing to the above-described features, it is possible, in the compression stroke injection mode of the in-cylinder injection internal combustion engine, to assure combustion stability while promoting an improvement in gas mileage, and hence to achieve an improvement in gas mileage, an improvement in the stability of combustion and cleaning of exhaust gas all together.

Preferably, the burning fluctuations reducing step may comprise correcting at least the ignition timing and the exhaust gas recirculation rate in accordance with results of a detection by the burning fluctuation detecting unit so that burning fluctuations are reduced. This makes it possible to assure prevention of deteriorations in combustion stability and exhaust gas quality while assuring an improvement in gas mileage.

The burning fluctuations reducing step may preferably comprise correcting at least the fuel injection timing and the exhaust gas recirculation rate in accordance with results of a detection by the burning fluctuation detecting unit so that burning fluctuations are reduced. This makes it possible to assure prevention of deteriorations in combustion stability and exhaust gas quality while assuring an improvement in gas mileage.

The burning fluctuations reducing step may preferably comprise correcting at least the fuel injection timing and the ignition timing in accordance with results of a detection by the burning fluctuation detecting unit so that burning fluctuations are reduced. This makes it possible to assure combustion stability while promoting an improvement in gas mileage, and hence to achieve both an improvement in gas mileage, an improvement in the stability of combustion and cleaning of exhaust gas at high levels.

The burning fluctuations reducing step may preferably comprise correcting the fuel injection timing, the ignition timing and the exhaust gas recirculation rate in accordance with results of a detection by the burning fluctuation detecting unit so that burning fluctuations are reduced. This makes it possible to assure combustion stability while promoting an improvement in gas mileage, and hence to achieve both an improvement in gas mileage, an improvement in combustion stability and cleaning of exhaust gas all together at extremely high levels.

Preferably, the burning fluctuations reducing step may comprise retarding the fuel injection timing by a first predetermined angle so that burning fluctuations are reduced. The burning fluctuations reducing step may preferably comprise retarding the ignition timing by a second predetermined angle so that burning fluctuations are reduced. Further, the burning fluctuations reducing step may preferably comprise decreasing the exhaust gas recirculation rate by a predetermined amount so that burning fluctuations are reduced. This makes it possible to assure combustion stability while promoting an improvement in gas mileage, and hence to achieve an improvement in gas mileage, an improvement in combustion stability and cleaning of exhaust gas all together at extremely high levels and further to simplify the logic of the control.

Preferably, the control method may further comprise a step in which, when the burning fluctuations are not reduced despite the performance of the burning fluctuations reducing step, the fuel injection mode is switched from the compression stroke injection mode to the intake stroke injection mode. This makes it possible to surely stabilize combustion even when the combustion cannot be stabilized in the compression stroke injection mode.

Preferably, the internal combustion engine further comprises air/fuel ratio control unit for controlling operation of the fuel injection valve on a basis of a preset target air/fuel ratio; and during the intake stroke injection mode, the burning fluctuations reducing step may correct the target air/fuel ratio in accordance with results of a detection by the burning fluctuation detecting unit. This makes it possible to perform optimal control corresponding to each fuel injection mode because in the intake stroke injection mode, an improvement in the stability of combustion is achieved by the control unit different from the unit employed in the compression stroke injection mode.

The target fuel injection timing and the target ignition timing may preferably be set at or in a vicinity of timings where a best gas mileage of the internal combustion engine is available. This makes it possible to assure combustion stability while making an improvement in gas mileage, and further to balance an improvement in gas mileage, an assurance of combustion stability and cleaning of exhaust gas at high levels.

Preferably, a correction value of the fuel injection timing and a correction value of the ignition timing may be set at substantially the same angle. This makes it possible to bring about the above-described individual effects or advantages while simplifying the logic of the control.

The first predetermined angle may preferably be set corresponding to a state of operation of the internal combustion engine. The second predetermined angle may preferably be set corresponding to a state of operation of the internal combustion engine. Further, the predetermined amount upon decreasing the exhaust gas recirculation rate may preferably be set corresponding to a state of operation of the internal combustion engine. This makes it possible to properly perform retarding control upon occurrence of a burning fluctuation so that the above-described individual effects or advantages can be brought about more surely.

Preferably, the internal combustion engine may be provided with plural cylinders; and the burning fluctuations reducing step may comprise performing the corrections of the fuel ignition timing and the ignition timing with respect to each of the cylinders. This makes it possible to independently perform specific and adequate retarding control for each cylinder upon detection of a burning fluctuation so that the above-described individual effects or advantages can be brought about more surely.

Preferably, the burning fluctuation detecting unit may detect occurrence of a misfire in the combustion chamber. This makes it possible to detect a misfire which may impair operation of the engine, so that drivability can be prevented from deterioration.

BRIEF DESCRIPTION OF THE DRAWINGS

FIG. 3 is a diagram showing a control map of the control system according to the one embodiment of the present invention for the in-cylinder injection internal combustion engine;

DETAILED DESCRIPTION OF THE INVENTION AND PREFERRED EMBODIMENT

Figure 1:
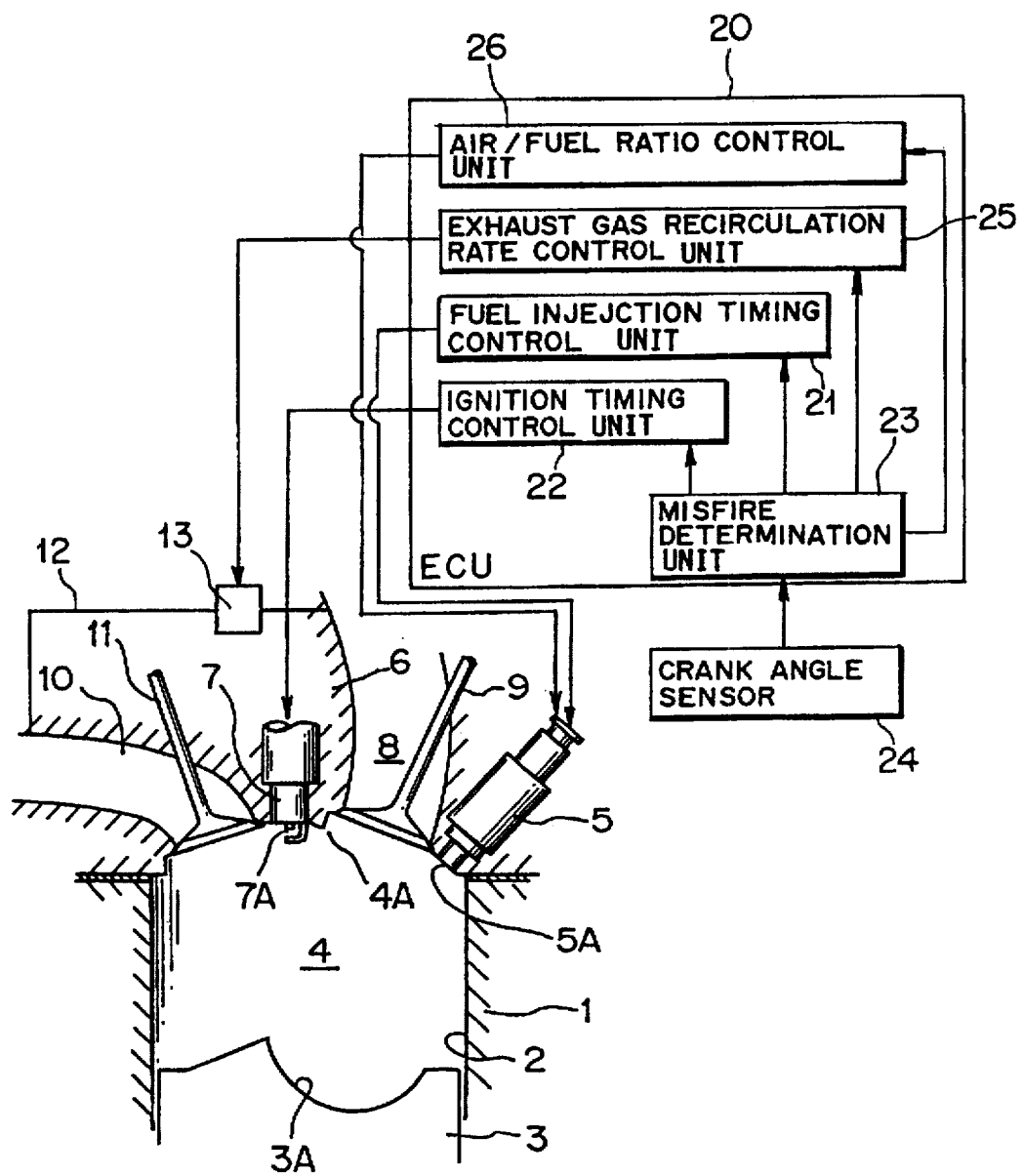
FIG. 1 is a schematic block diagram depicting a control system according to one embodiment of the present invention for an in-cylinder injection internal combustion engine.

The one embodiment of the present invention will hereinafter be described with reference to the drawings. FIG. 1 through FIG. 5 illustrate the control system and method according to the one embodiment of the present invention for the in-cylinder injection internal combustion engine and characteristics of the control system, and FIG. 1 is a schematic block diagram of the control system.

As is illustrated in FIG. 1, in the in-cylinder injection internal combustion engine (hereinafter referred to as the "engine") to which the system according of the present embodiment is applied, a piston 3 is arranged within a cylinder 2 formed in a cylinder block 1 and a fuel injection valve (injector) 5 is disposed in a combustion chamber 4 defined above the piston 3. An injection nozzle 1A of the fuel injection valve 5 is directly facing on the combustion chamber 4 so that fuel can be directly injected into the combustion chamber 4.

In a top wall of the piston 3, a curved-wall recess 3A is formed so that air introduced through an intake port 8 flows as longitudinal swirl. The injector 5 is arranged in a ceiling portion 4A of the combustion chamber 41 which is formed on a cylinder head 6. A spark plug 7 is also arranged in the ceiling portion 4A of the combustion chamber. In particular, these injector 5 and spark plug 7 are arranged in such a positional relationship that fuel injected through the injector 5 in an intake stroke is allowed to flow to a vicinity of a sparking portion 7A of the spark plug 7 together with the flow of air introduced through the intake port 8. When fuel is injected in a compression stroke, the thus-injected fuel is allowed to flow under guidance by the curved-wall recess 3A and is then focused around the sparking portion 7A of the spark plug 7.

In FIG. 1, there are also shown an intake valve 9, an exhaust port 10, and an exhaust valve 11.

Further, an EGR passage 12 communicates the above-mentioned exhaust port with an upstream side of the above-mentioned intake port by way of an EGR valve 13. The EGR valve 13 is of the stepper motor type that its opening can be changed depending on the state of operation of the engine. By driving this motor stepwise as much as desired, the EGR rate is changed. By such EGR passage 12 and EGR valve 13, an exhaust gas recirculation system is constructed to recirculate a portion of exhaust gas of the engine to an intake system. Incidentally, the actuator for operating the EGR valve 13 is not limited to an actuator of the stepper motor type but an actuator of a different type such as the solenoid type can also be used.

The injector 5, spark plug 7 and EGR valve 13 are controlled in operation by an electronic control unit (ECU) 20. The ECU 20 is therefore internally provided with a function (fuel injection timing control unit) 21 for controlling a fuel injection timing of the injector 5 on a basis of a preset target fuel injection timing, a function (ignition timing control unit) 22 for controlling an ignition timing of the spark plug 7 on a basis of a preset target injection timing, a function (exhaust gas recirculation rate control unit) 25 for controlling an opening of the EGR valve 13 on a basis of a preset target EGR rate, and a function (air/fuel ratio control unit) 26 for controlling a fuel injection rate from the injector 5 on a basis of a preset target air/fuel ratio.

The fuel injection timing control unit 21 controls the operation of the injector 5 on the basis of a target fuel injection timing preset corresponding to a state of operation of the internal combustion engine, i.e., an engine load and an engine speed during normal combustion of the internal combustion engine.

On the other hand, the ignition timing control unit 22 controls the operation of the injector 5 on the basis of a target ignition timing preset corresponding to a state of operation of the internal combustion engine, i.e., an engine load and an engine speed during normal combustion of the internal combustion engine.

Further, the exhaust gas recirculation rate control unit 25 controls the opening of the EGR valve 13 on the basis of a target EGR rate preset corresponding to a state of operation of the internal combustion engine, i.e., an engine load and an engine speed during normal combustion of the internal combustion engine.

Moreover, the air/fuel ratio control unit 26 controls the operation of the injector 5 on the basis of a target air/fuel ratio preset corresponding to a state of operation of the internal combustion engine, i.e., an engine load and an engine speed during normal combustion of the internal combustion engine.

Figure 4:
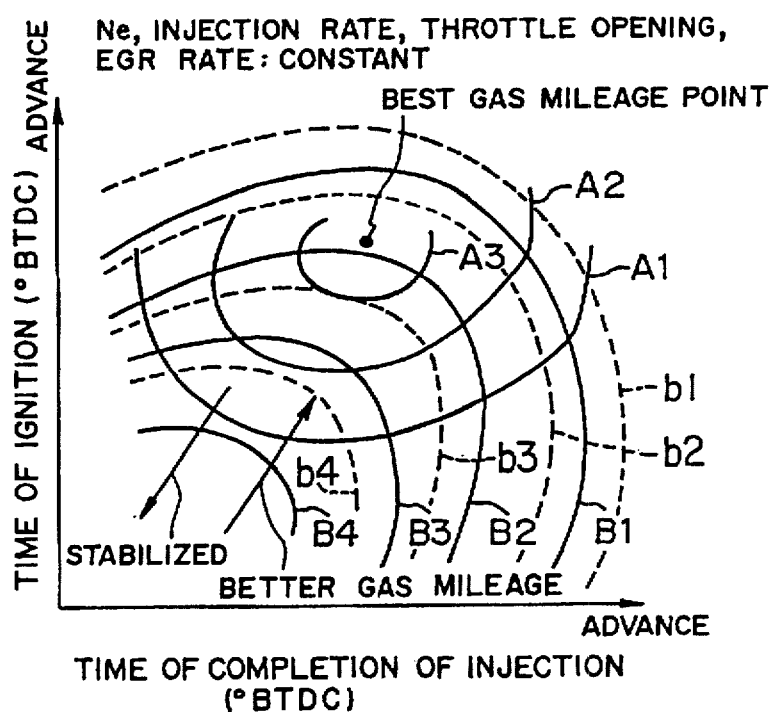
FIG. 4 is a diagram illustrating characteristics of the in-cylinder injection internal combustion engine in a compression stroke injection mode under control according to the one embodiment of the present invention.
Figure 5:
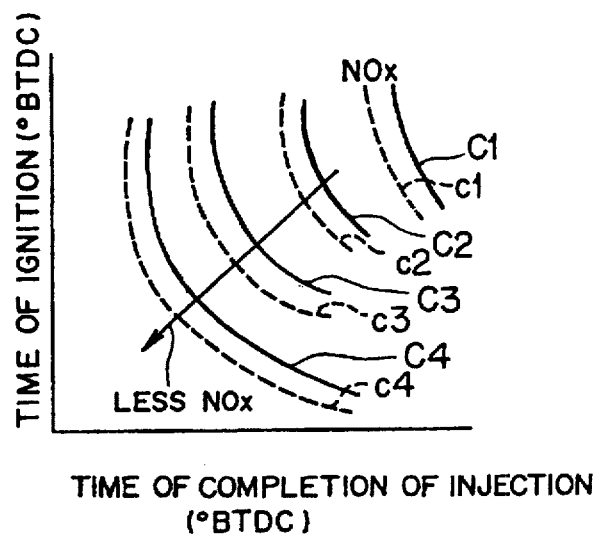
FIG. 5 is a diagram illustrating characteristics of the in-cylinder injection internal combustion engine in the compression stroke injection mode under control according to the one embodiment of the present invention.

Based on FIG. 4 and FIG. 5, a description is now made about the target fuel injection timing, target ignition timing and target EGR rate. Under the conditions that the engine speed Ne, the fuel injection rate, the throttle opening and the EGR rate (for example 50%) all remain constant, characteristics of gas mileage and combustion stability relative to the time of completion of fuel injection and the time of ignition can be illustrated as shown in FIG. 4 and likewise, characteristics of the rate of NOx emission in exhaust gas relative to the time of completion of fuel injection and the time of ignition can be illustrated as shown in FIG. 5.

Describing characteristics in a compression stroke injection mode on the basis of FIG. 4 and FIG. 5, A1, A2 and A3 in FIG. 4 are contour lines indicating levels of gas mileage, the gas mileage becomes better (in other words, it become more fuel saving) in the order of A1, A2 and A3, and the gas mileage becomes best at the point indicated as "best gas mileage point". On the other hand, B1, B2, B3 and B4 are contour lines indicating levels of combustion stability, and the combustion stability becomes higher in the order of B1, B2, B3 and B4.

FIG. 5 also shows, by solid lines, rates of NOx emission in exhaust gas relative to the time of completion of fuel injection and the time of ignition under similar conditions as in FIG. 4. It is indicated that an advance in the time of ignition results in earlier combustion and hence in a greater rate of NOx emission in exhaust gas and also that an earlier time of completion of fuel injection leads to a reduction in the stratification of an air-fuel mixture and thus to a greater rate of NOx emission. The rate of NOx emission decreases in the order of C1, C2, C3 and C4.

Also shown by broken lines are combustion stabilities relative to the time of completion of fuel injection and the time of ignition, which is similar to those indicated by solid lines in FIG. 4 and FIG. 5 and was obtained under similar conditions of engine speed Ne, fuel injection rate and throttle opening except that the EGR rate was decreased (for example, by 30%). In FIG. 4, b1, b2, b3 and b4 are contour lines indicating levels of combustion stability, and the individual levels show the same combustion stabilities as B1, B2, B3 and B4 which are the above-described levels of combustion stability. A decrease in the EGR rate leads to higher combustion stability even when the time of completion of fuel injection and the time of ignition remain unchanged.

Further, rates of NOx emission in exhaust gas relative to the time of completion of fuel injection and the time of ignition are shown by broken lines in FIG. 5. The rate of NOx emission decreased in the order of c1, c2, c3 and c4, and the individual rates of NOx emission indicate the same rates of NOx emission as the above-mentioned C1, C2, C3 and C4. A decrease in the EGR rate leads to an increase in the rate of NOx emission even when the time of completion of fuel injection and the time of ignition remain unchanged.

As is shown in FIG. 4 and FIG. 5, setting of the time of completion of fuel injection, the time of ignition and the EGR rate in such a way as providing a best gas mileage state does not necessarily assure satisfaction with respect to combustion stability and NOx reducibility. It is therefore necessary to provide load-rpm maps in which times of completion of fuel injection, times of ignition and EGR rates are mapped in accordance with engine loads (for example, throttle openings) and engine speeds Ne to balance the gas mileage, the combustion stability and the NOx reducibility, respectively, and then perform fuel injection control, ignition timing control and EGR control. Needless to say, when the gas mileage is concerned, it is most preferred to set the time of completion of fuel injection and the time of ignition at or near times corresponding to the best gas mileage point.

Basically, it is only necessary to determine a target fuel injection timing, a target ignition timing and a target exhaust gas recirculation rate on the basis of a time of completion of fuel injection, a time of ignition and an EGR ratio at which the gas mileage becomes the best, that is, a time of completion of fuel injection, a time of ignition and an EGR ratio that give the best gas mileage point.

Whenever the engine speed Ne, the fuel injection rate, the throttle opening and/or the EGR rate changes, such a best gas mileage point also varies corresponding to the change or changes. As the fuel injection rate and EGR rate are often controlled in accordance with the engine load (the brake mean effective pressure Pe is most suitable but the throttle opening or the accelerator stroke is also usable) and the engine speed Ne, it is preferred to set the best gas mileage point in accordance with the engine load (throttle opening or accelerator stroke) and the engine speed Ne.

Accordingly, maps with target fuel injection timings, target ignition timings, target EGR rates and target air/fuel ratios mapped relative to the engine load and the engine speed are stored in the fuel injection timing control unit 21, the ignition timing control unit 22, the exhaust gas recirculation rate control unit 25 and the air/fuel ratio control unit 26, respectively. Using these maps, a target fuel injection timing, a target ignition timing, a target EGR rate and a target air/fuel ratio are set based on an engine load and an engine speed. Based on these target fuel injection timing, target ignition timing, target EGR rate and target air/fuel ratio, the actuation of the injector 5, spark plug 7 and EGR valve 13 is controlled.

In a generally-expected state of operation of the engine, it may however be considered that in some instances, the stability of combustion may not be sufficiently achieved at the best gas mileage point or the rate of NOx emission may become high at the best gas mileage point. Accordingly, the above-mentioned target fuel injection timings, target ignition timings, target EGR rates and target air/fuel ratios are therefore not necessarily set at the best gas mileage point, but in view of the combustion stability and the rate of NOx emission, they are set based on a time of completion of fuel injection, a time of injection, an EGR rate and an air/fuel ratio, which are near the best gas mileage point, so that the combustion stability and the rate of NOx emission can be satisfied to some extent.

Incidentally, the target fuel injection timing which relates to the control of the injector 5 is specified by a time of initiation of fuel injection and a time of completion of fuel injection. In this embodiment, the time of completion of fuel injection is determined from the above-described target fuel injection timing map, whereas the time of initiation of fuel injection is determined by calculating it backward from an injector drive time, which corresponds to a fuel injection amount also calculated based on an engine load, an engine speed and the like, and a time of completion of fuel injection determined from the target fuel injection timing map.

Depending on the use environment of the engine, the employed fuel and the conditions of the engine itself, the combustion stability, however, may deteriorate even when the target fuel injection timing, target ignition timing, target EGR rate and target air/fuel ratio are set to achieve a good gas mileage during a normal operation while assuring combustion stability.

As a reduction in combustion stability leads to burning fluctuations, the ECU 20 in the present system is internally provided with a function for detecting burning fluctuations (burning fluctuation detecting unit) so that upon detection of a burning fluctuation, the target fuel injection timing, target ignition timing and target EGR rate are corrected. This embodiment is designed in such a way that, paying attention to a misfire as a typical phenomenon of a burning fluctuation, the occurrence of a misfire is detected as the occurrence of a burning fluctuation.

The system is therefore provided with a function (misfire determination unit) 23 for the determination of a misfire. When a misfire is determined by the misfire determination unit (burning fluctuation detecting unit) 23 (in other words, a burning fluctuation is detected) in the compression stroke injection mode, the fuel injection timing control unit 21 and ignition timing control unit 22 retard the target fuel injection timing and target ignition timing by predetermined crank angles and the exhaust gas recirculation rate control unit 25 decreases the target EGR rate.

There are a variety of methods for the determination of a misfire by the misfire determination unit 23. For example, as also disclosed in Japanese Patent Application Laid-Open (Kokai) No. HEI 6-229310, a misfire can be determined based on a detection signal from a crank angle sensor 24. Described specifically, upon occurrence of a misfire, the engine speed (hence, the angular speed of a crankshaft) is momentarily reduced only at the incident of this misfire. Taking a clue from this, a misfire can be estimated to have occurred when, while determining time intervals of inputs of crank angle signals available at predetermined crank angles, an angular acceleration of the crankshaft becomes smaller than a first predetermined negative value and also when a change in the angular acceleration of the crankshaft immediately before the angular acceleration of the crankshaft becomes smaller than the predetermined negative value as described above is less than a second predetermined negative value and a change in the angular acceleration of the crankshaft immediately after the angular acceleration of the crankshaft has become smaller than the first predetermined negative value is greater than a third predetermined positive value. Of course, a misfired cylinder can be identified based on crank angle signals.

Upon determination of a misfire as described above, the misfired cylinder is subjected to retarding control with respect to the target fuel injection timing and target ignition timing by the fuel injection timing control unit 21 and ignition timing control unit 22. Needless to say, each misfire-free cylinder is not subjected to such retarding control, and is controlled under the target fuel injection timing and target ignition timing determined from the corresponding maps.

As an alternative, it is also possible to perform decreasing control of the target EGR rate by the exhaust gas recirculation rate control unit 25. Of course, the EGR rate is also decreased for each misfire-free cylinder. This decrease however does not cause any particular problem, because it is a control toward high combustion stability as shown in FIG. 4.

Retard angles of the target fuel injection timing and target ignition timing by the fuel injection timing control unit 21 and ignition timing control unit 22 as well as a decrease amount of the target EGR rate by the exhaust gas recirculation rate control unit 25 upon such determination of a misfire vary depending on the operation state of the engine, so that it is desired to set them relative to engine loads and engine speeds. As is illustrated in FIG. 3 by way of example, a map can be set with an operation zone divided into Zone 0 to Zone 5 in accordance with the engine load and the engine speed so that initial values Xn (i.e., X0 to X5) of a retard angle and initial values Yn (i.e., Y0 to Y5) of a decrease amount are set for the respective zones. According to a detected engine load and a detected engine speed, one of the initial retard angles X0 to X5 or one of the initial decrease amounts Y0 to Y5 is selected.

However, if an engine load and an engine speed fall outside Zone 0 to Zone 5, a zone selected in the preceding control (any one of Zone 0 to Zone 5) should be used. A unit for storing a selected zone is therefore arranged (not shown) so that, whenever a zone is newly selected, the current zone is stored as the zone selected in the preceding control while being updated.

Further, the initial retard angle Xn of each zone cannot be set absolutely optimal for every cylinder and the initial decrease amount Yn of each zone cannot be set completely optimal for all cylinders. According to the system of this embodiment, the fuel injection timing control, ignition timing control or exhaust gas recirculation rate control is therefore started with the initial retard angle Xn or the initial decrease amount Yn. While learning more appropriate retard angles or decrease amounts for the respective zones, they are set as learned retard angles or learned decrease amounts for the respective zones. Based on these learned retard angles and learned decrease amounts of the respective zones, retard angles RX and decrease amounts RY are set for use in actual control. Incidentally, the learned retard angles RXn and learned decrease amounts RYn of the respective zones are successively set while learning data in the other zones, so that the control by smaller retard angles and decrease amounts will become feasible.

An in-cylinder injection engine is generally set so that fuel is ignited when it has concentrated in the vicinity of a spark plug, although this ignition timing may vary depending on the characteristics of the engine. It is therefore possible to estimate a substantially optimal fuel injection timing for an ignition timing. When the ignition timing alone is excessively retarded as in conventional engines, there is the potential problem that the combustion stability may be conversely deteriorated as is evident from FIG. 4. When the ignition timing alone is retarded, the combustion stability can be improved by retarding only the ignition timing until immediately before a spray of fuel flows past the electrodes of the spark plug. Further, the retard control of the target ignition timing by the ignition timing control unit 22 after the determination of a misfire is performed in such a way that, when no further misfire takes place after the initiation of the control, the ignition timing is allowed to return the basic target ignition timing by gradually decreasing the retard angle, namely, by gradually advancing the ignition timing after the retardation.

When the fuel injection timing alone is excessively retarded, on the other hand, there is the potential problem that the combustion stability may be conversely deteriorated as is evident from FIG. 4. When the timing of fuel injection alone is retarded, the combustion stability can be improved by retarding only the timing of fuel injection until a time which is sufficient to permit arrival of a leading end of sprayed fuel at the electrodes of the spark plug during the discharge of the spark plug. Further, the retard control of the target fuel injection timing by the fuel injection timing control unit 21 after the determination of a misfire is performed in such a way that, when no further misfire takes place after the initiation of the control, the fuel injection timing is allowed to return to the basic target fuel injection timing by gradually decreasing the retard angle, namely, by gradually advancing the fuel injection timing after the retardation.

Further, when the EGR rate alone is decreased, there is, as is evident from FIG. 4, no potential problem that the combustion stability would be deteriorated. An excessive decrease in the EGR rate however involves the potential problem that the rate of NOx emission is increased to deteriorate the quality of exhaust gas. It is therefore desired to decrease the EGR rate within a range that no significant adverse influence would be given to the quality of exhaust gas. Further, the decreasing control of the target EGR rate by the exhaust gas recirculation rate control unit 25 after determination of a misfire is conducted so that, when no further misfire takes place after the initiation of the control, the EGR rate is allowed to return to the basic target EGR rate by gradually reducing the decrease amount, namely, by gradually increasing the EGR rate after the decrease.

When the ignition timing and the fuel injection timing are both retarded, it is possible to improve, as is evident from FIG. 4, the combustion stability further than retardation of only one of the timings. Such an optimal retard angle of the target fuel injection timing and that of the target ignition timing at the time of a misfire can be set at substantially the same value. In this embodiment, the retard angles RX set for use in control are therefore used as retard angles of the target fuel injection timing and also as retard angles of the target ignition timing.

Of course, where optimal retard angles of the target fuel injection timing and those of the target ignition timing at the time of a misfire are substantially different from each other due to the characteristics of the engine, different maps (or tables) such as that shown in FIG. 3 are provided, one for the target fuel injection timing and the other for the target ignition timing, so that retard angles can be set in accordance with them, respectively.

Controls of the target fuel injection timing and target ignition timing by the fuel injection timing control unit 21 and ignition timing control unit 22 after the determination of a misfire are performed in such a way that, when no further misfire takes place after the initiation of the controls, the fuel injection timing and ignition timing are allowed to return to the basic target fuel injection timing and target ignition timing, respectively, by gradually decreasing the retard angles, namely, by gradually advancing the fuel injection timing and ignition timing, respectively, after the retardation.

When the ignition timing is retarded and the EGR rate is decreased, it is possible, as is evident from FIG. 4, to improve the combustion stability further and also to suppress an increase in the rate of NOx emission, the increase being caused by the decrease in the EGR rate, than retardation of only one of the timing and the rate. Such an optimal retard angle of the target ignition timing and such an optimal decrease of the EGR rate at the time of a misfire can be set in substantially the same operation zone. In this embodiment, the retard angles RX and the decrease amounts RY set for use in control are therefore stored in the same map.

Needless to say, if the optimal delay angles of the target ignition timing and the optimal decrease amount of the target EGR rate at the time of a misfire vary substantially depending on the operation zone due to the characteristics of the engine or if it is desired to decrease the capacity of a single map, different maps (or tables) such as that shown in FIG. 3 are provided, one for the target ignition timing and the other for the target EGR rate, so that retard angles and decrease amounts can be set in accordance with them, respectively.

The retarding control of the target ignition timing by the ignition timing control unit 22 and the decreasing control of the target EGR rate by the exhaust gas recirculation rate control unit 25, after the determination of a misfire, are performed in such a way that, when no further misfire takes place after the initiation of the controls, the ignition timing and EGR rate are allowed to return to the basic target ignition timing and target EGR rate by gradually reducing its retard angle and its decrease amount, namely, by gradually advancing the ignition timing and increasing the EGR rate, respectively, after the retardation and decrease.

The above-mentioned procedures can also be followed likewise when the fuel injecting timing is retarded and the EGR rate is decreased.

When the fuel injection timing and ignition timing are retarded and the EGR rate is decreased, retard angles and decrease amount smaller than those employed in the above-mentioned methods can improve the combustion stability further and also suppress an increase of NOx further as is evident from FIG. 4, whereby the combustion stability can be promptly improved at the time of occurrence of a misfire.

Where plural threshold values are provided for the determination of burning fluctuations, for example, such as a value for the determination of small deterioration in combustion and another value for the determination of large deterioration in combustion, only one or two of the fuel injection timing, ignition timing and EGR rate may be controlled to improve the combustion stability in the case of a small deterioration in combustion and all the above-described parameters may be controlled to improve the combustion stability in the case of a large deterioration in combustion.

A uniform air-fuel mixture is introduced throughout the combustion chamber in the intake stroke injection mode. Burning fluctuations are therefore reduced by enriching the target air/fuel ratio by the air/fuel ratio control unit 26 in much the same way as in the conventional engines.

If burning fluctuations still take place in the compression injection mode although retarding and decreasing controls of the fuel injection timings, ignition timing and EGR rate are performed in attempts to stabilize the combustion, the combustion stability can be improved by inhibiting the compression stroke injection mode and instead by selecting the intake stroke injection and then performing control with the target air/fuel ratio set in the vicinity of a stoichiometric air/fuel ratio by target air/fuel ratio control unit 26. Additional measures may also be arranged for the determination of a failure of the fuel system, ignition system or EGR system and for the performance of a countermeasure at the time of such a failure (for example, prohibition of the compression stroke injection mode).

As the control system and method according to the one embodiment of the present invention for the in-cylinder injection internal combustion engine are constructed as described above, they perform control as will be described hereinafter.

Figure 2:
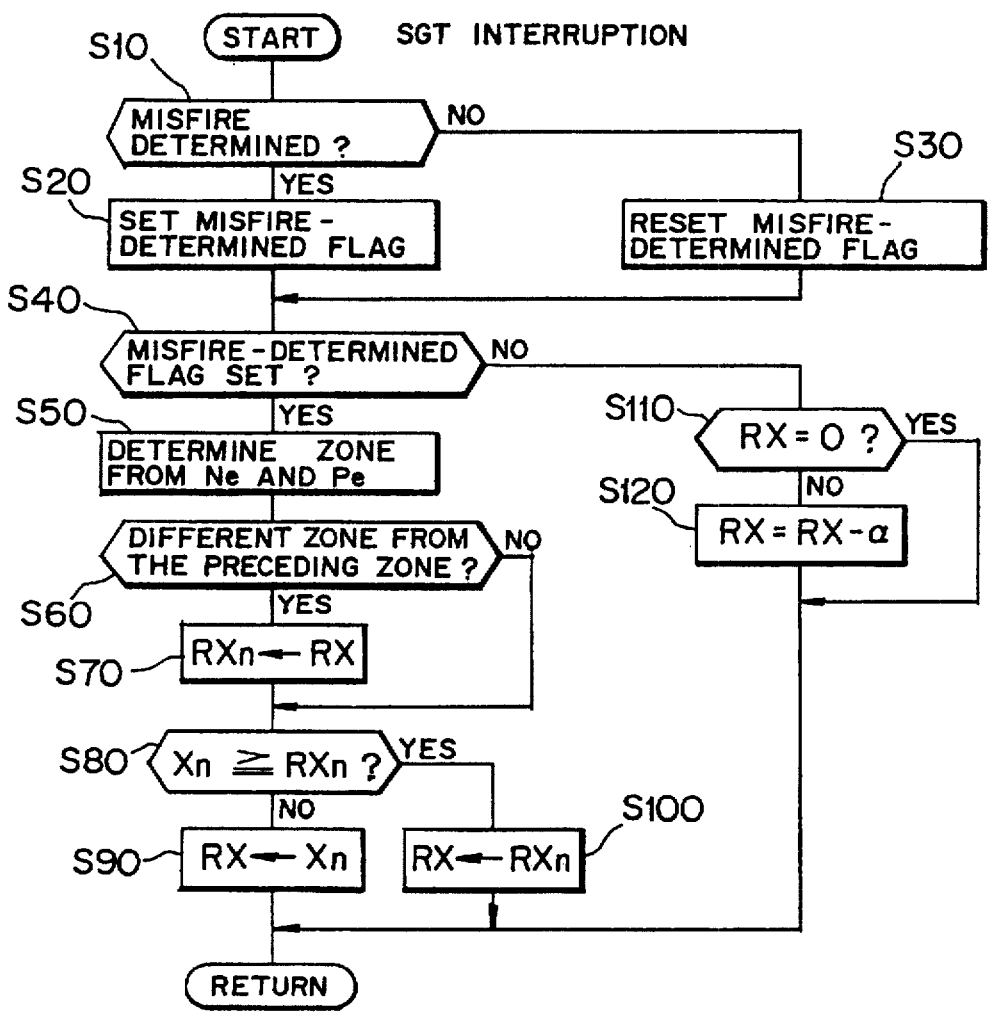
FIG. 2 is a flow chart illustrating details of control (in which a fuel injection timing and an ignition timing are both retarded) by the control system according to the one embodiment of the present invention for the in-cylinder injection internal combustion engine.

Describing in detail about control which is performed with respect to each cylinder upon retarding both a fuel injection timing and an ignition timing, the control is carried out, for example, as illustrated in the flow chart of FIG. 2.

Namely, as is shown in FIG. 2, the results of a detection of a misfire is first determined by the misfire determination means 23 (step S10). If a misfire is determined, a misfire-determined flag is set (step S20) but otherwise, the misfire-determined flag is reset (step S30).

It is then determined whether the misfire-determined flag has been set (step S40). If the misfire-determined flag is found to have been set, in other words, when a misfire has been determined, the routine advances to step S50 and based on an engine speed Ne and an engine load (brake mean effective pressure) Pe, it is determined which one of Zone 0 to Zone 5 a current operating state of the engine is in. Next, in step S60, it is determined whether the zone determined in step S50 is the same as or different from the zone determined in the preceding control. If it is different from the zone determined in the preceding control, a current retard angle RX is set as a learned retard angle value RXn (step S70). The term "the current retard angle RX" unit a retard angle employed at a closest time point, namely, the retard angle employed in the preceding control. Upon initiation of control, an initial retard angle value (one of X0 to X5) corresponding to the zone determined in step S50 is set as the current retard angle RX.

Advancing next to step S80, it is determined whether the initial retard angle value (the one of X0 to X5) corresponding to the zone determined in step S50 is equal to or greater than the learned retard angle value RXn. If the initial retard angle value corresponding to the determined zone is equal to or greater the learned retard angle value RXn, the learned retard angle value RXn is set as a current retard angle value RX (step S100). In other words, as the current retard angle value (retard angle value for use in the control) RX, the smaller one of the initial retard angle value corresponding to the determined zone and the learned retard angle value RXn is used.

As a consequence, as the retard angle value for use in the control, updating to a smaller optimal value is successively effected through learning so that stabilization of combustion in the engine can be achieved while preventing a reduction in gas mileage.

In accordance with the current retard angle amount RX, retarding controls of the target fuel injection timing and target ignition timing are performed.

If the misfire-determined flag is found to have been reset upon determination of setting of the misfire-determined flag, the routine advances from step S40 to step S110 to determine whether a current retard angle value (the retard angle value used in the preceding control in this embodiment) RX is 0. If the current retard angle value (the retard angle value in the preceding control) RX is not 0, a unit angle (which is set at 1 in this embodiment) is subtracted from the retard angle value RX, which was employed in the preceding control, to obtain a retard angle value (=RX−1) for use in the current control.

Accordingly, if there is no further misfire after the determination of a misfire, the retard angle value RX is gradually decreased by the unit angle per routine and eventually, the retard angle reaches 0 so that the retarding control is completed.

The system of this embodiment can achieve both an improvement in gas mileage and assurance of stability in combustion because, as has been described above, it performs control while setting beforehand a target fuel injection timing and a target ignition timing to provide a good gas mileage and, when a misfire takes place, a further misfire is prevented by performing control to retard the fuel injection timing and the ignition timing. Of course, stabilization of the combustion is advantageous for the reduction of NOx, so that an improvement in gas mileage, assurance of combustion stability and cleanliness in exhaust gas can be balanced at high levels.

In addition, since the retard angle value RX upon retarding control is set as small as feasible through learning, leading to the advantage that a deterioration in gas mileage at the time of the retarding control is slight.

The delaying control is brought to completion while gradually reducing the retard angle value RX, so that good feeling can be obtained from the combustion during the transition period until the completion of the retarding control.

With reference to the flow chart, the description has heretofore been made about retardation of both the fuel injection timing and the ignition timing. To improve the combustion stability only by decreasing control of the EGR rate instead of those two parameters, it is only necessary to replace Rx, Rxn, Xn and $\alpha$ by Ry, Ryn, Yn and $\beta$, respectively, in FIG. 2. Here, $\beta$ unit a unit amount upon decreasing the EGR rate (unit decrease amount). By such decreasing control of the EGR rate alone, it is still possible to achieve an improvement in gas mileage, an improvement in the stability of combustion, and purification of exhaust gas.

It is also possible to perform two or three of the above-described retarding control of the fuel injection timing and/or the ignition timing and decreasing control of the EGR rate. For example, the flow chart shown in FIG. 6 shows control when retarding control of a fuel injection timing or an ignition timing and decreasing control of an EGR rate are performed or when the retarding control of the fuel injection timing, ignition timing and the decreasing control of the EGR rate are all performed.

Figure 6:
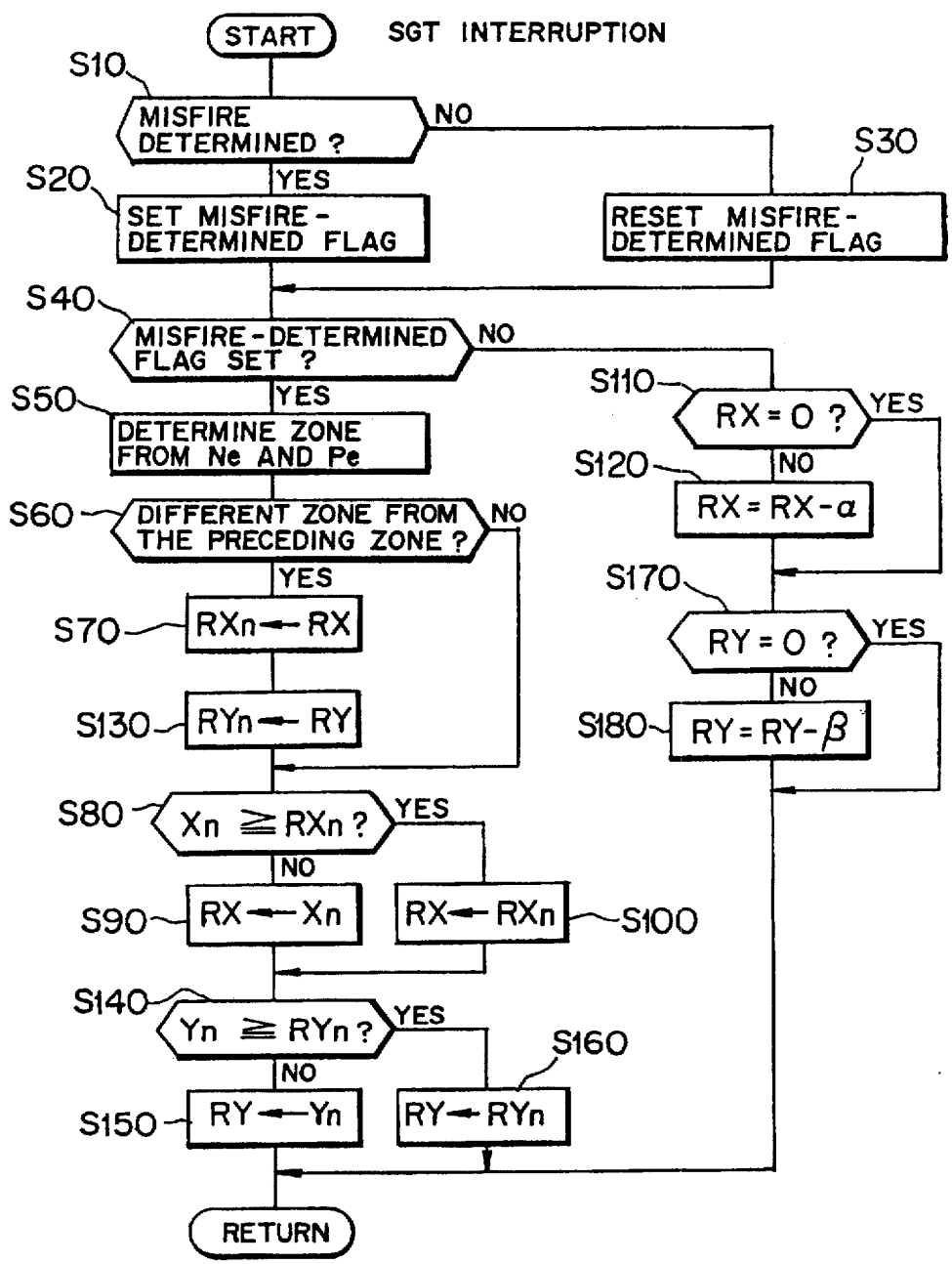
FIG. 6 is a flow chart illustrating details of control (in which retarding control of a fuel injection timing and/or an ignition timing and decreasing control of an EGR rate are both performed) by the control system according to the one embodiment of the present invention for the in-cylinder injection internal combustion engine.

In FIG. 6, processings in the respective steps of from S10 to S120 are the same as those shown in FIG. 2 so that their detailed description is omitted herein. Because steps of from S130 to S180 have been added, a description will be made centering around these steps.

As is illustrated in FIG. 6, when a misfire-determined flag is set (step S20) as a result to determination of a misfire (step S10), the routine advances from step S40 to step S50 to perform determination of a zone. If the results of a determination of a zone in a current state of operation of the engine is different from the results of a determination of a zone in the preceding control, the routine advances from step S60 to step S70 and in addition to setting of a current retard angle value RX as a learned retard angle value RXn, a current decrease amount RY of the EGR rate is set as a learned decrease amount value RYn (step S130).

After the current retard angle value is updated by the processings of steps S80 to S100, the current decrease amount is updated by processings of steps S140 to S160. Namely, it is determined in step S140 whether an initial decrease amount value Yn (one of Y0 to Y5) corresponding to the zone determined in step S50 is equal to or greater than the learned decrease amount value RYn. If the initial decrease amount value Yn corresponding to the determined zone is equal to or greater than the learned decrease amount value RYn, the learned decrease amount value RYn is set as a current decrease amount RY (step S150). If the initial decrease amount value Yn corresponding to the determined zone is smaller than the learned decrease amount value RYn, the initial decrease amount value Yn is set as the current decrease amount RY (step S160). Namely, as the current decrease amount (decrease amount value for use in the control) RY, the smaller one of the initial decrease amount value Yn corresponding to the determined zone and the learned decrease amount value RYn is used.

On the other hand, if as a result of the determination of the misfire (step S10), the misfire-determined flag is reset (step S30), the routine advances from step S40 to step S120 and in addition to subtractions from the retard angle value RX, subtractions from the decrease amount RY are performed in steps S170 to S180. Namely, the routine advances from step S170 to step S180 and until the decrease amount RY reaches 0, the decrease amount RY is subtracted by the unit decrease amount β per routine.

As is shown in FIG. 6, performance of two or three of the retarding control, that is, the fuel injection timing and/or the ignition timing and decreasing control of the EGR rate makes it possible to achieve an improvement in gas mileage, an improvement in the stability of combustion and cleaning of exhaust gas at extremely high levels.

Incidentally, a burning fluctuation is detected by determining a misfire in the above-described embodiment. The present invention is however not limited to such an embodiment, and retarding control of the target fuel injection timing and the target ignition timing by the fuel injection timing control unit 21 and ignition timing control unit 22 and decreasing control of the target EGR rate by the exhaust gas recirculation rate control unit 25 can be performed by detecting a burning fluctuation of such a degree as not resulting in a misfire. In this case, the stability of combustion may be improved by controlling one or two of the fuel injection timing, ignition timing and EGR rate while setting retard angles and/or decrease amount equal to those set in the case of a burning fluctuation of such a degree as resulting in a misfire.

Alternatively, all of the fuel injection timing, ignition timing, and EGR rate may be controlled while setting retard angles and decrease amount smaller than those set in the case of misfire.

The control system according to the present invention makes it possible to assure the stability of combustion in an in-cylinder injection internal combustion engine while promoting an improvement in gas mileage by the compression stroke injection. It is therefore possible to achieve an improvement in gas mileage, an improvement in the stability of combustion and cleaning of exhaust gas at the same time. Therefore, the control system according to the present invention is suitable for an engine of a vehicle, can simultaneously satisfy various requirements for vehicle engines, such as an improvement in drivability owing to stabilized combustion, saving in operation cost owing to a reduced gas mileage and environmental protection owing to promoted cleaning of exhaust gas, and is extremely useful.

What is claimed is:

1. A control system for an in-cylinder injection internal combustion engine capable of selecting an intake stroke injection mode, in which an injection of fuel is performed primarily in an intake stroke, or a compression stroke injection mode, in which an injection of fuel is performed primarily in a compression stroke, as a fuel injection mode in accordance with a state of operation, comprising:

a fuel injection valve for directly injecting fuel into a combustion chamber of said internal combustion engine;

a spark plug arranged in said combustion chamber to ignite an air-fuel mixture in said combustion chamber;

an exhaust gas recirculation system for recirculating a portion of exhaust gas of said internal combustion engine to an intake system of said internal combustion engine;

burning fluctuation detecting unit for detecting a fluctuated state of burning in said internal combustion engine;

fuel injection timing control unit for controlling a fuel injection timing of said fuel injection valve on a basis of a target fuel injection timing preset corresponding to a state of operation of said internal combustion engine during normal operation of said internal combustion engine;

ignition timing control unit for controlling an ignition timing of said spark plug on a basis of a target ignition timing preset corresponding to a state of operation of said internal combustion engine during normal operation of said internal combustion engine; and exhaust gas recirculation rate control unit for controlling an exhaust gas recirculation rate of said exhaust gas recirculation system on a basis of a target exhaust gas recirculation rate preset corresponding to a state of operation of said internal combustion engine during normal operation of said internal combustion engine;

whereby during said compression stroke injection mode, said control system corrects at least one of said fuel injection timing, said ignition timing and said exhaust gas recirculation rate in accordance with results of a detection by said burning fluctuation detecting unit so that burning fluctuations are reduced.

2. The control system according to claim 1, wherein said control system corrects at least said ignition timing and said exhaust gas recirculation rate in accordance with results of a detection by said burning fluctuation detecting unit so that burning fluctuations are reduced.

3. The control system according to claim 1, wherein said control system corrects at least said fuel injection timing and said exhaust gas recirculation rate in accordance with results of a detection by said burning fluctuation detecting unit so that burning fluctuations are reduced.

4. The control system according to claim 1, wherein said control system corrects at least said fuel injection timing and said ignition timing in accordance with results of a detection by said burning fluctuation detecting unit so that burning fluctuations are reduced.

5. The control system according to claim 1, wherein said control system corrects said fuel injection timing, said ignition timing and said exhaust gas recirculation rate in accordance with results of a detection by said burning fluctuation detecting unit so that burning fluctuations are reduced.

6. The control system according to claim 1, wherein upon detection of a burning fluctuation by said burning fluctuation detecting unit, said control system retards said fuel injection timing by a first predetermined angle so that burning fluctuations are reduced.

7. The control system according to claim 1, wherein upon detection of a burning fluctuation by said burning fluctuation detecting unit, said control system retards said ignition timing by a second predetermined angle so that burning fluctuations are reduced.

8. The control system according to claim 1, wherein upon detection of a burning fluctuation by said burning fluctuation detecting unit, said control system decreases said exhaust gas recirculation rate by a predetermined amount so that burning fluctuations are reduced.

9. The control system according to claim 1, wherein, when burning fluctuations are not reduced despite said correction, said control system switches said fuel injection mode from said compression stroke injection mode to said intake stroke injection mode.

10. The control system according to claim 1, wherein said control system further comprises air/fuel ratio control unit for controlling operation of said fuel injection valve on a basis of a preset target air/fuel ratio; and during said intake stroke injection mode, said air/fuel ratio control unit corrects said target air/fuel ratio in accordance with results of a detection by said burning fluctuation detecting unit.

11. The control system according to claim 1, wherein said target fuel injection timing and said target ignition timing are set at or in a vicinity of timings where a best gas mileage of said internal combustion engine is available.

12. The control system according to claim 4, wherein a correction value of said fuel injection timing and a correction value of said ignition timing are set at substantially the same angle.

13. The control system according to claim 6, wherein said first predetermined angle is set corresponding to a state of operation of said internal combustion engine.

14. The control system according to claim 7, wherein said second predetermined angle is set corresponding to a state of operation of said internal combustion engine.

15. The control system according to claim 8, wherein said predetermined amount upon decreasing said exhaust gas recirculation rate is set corresponding to a state of operation of said internal combustion engine.

16. The control system according to claim 4, wherein said internal combustion engine is provided with plural cylinders; and said control system performs said corrections of said fuel ignition timing and said ignition timing with respect to each of said cylinders.

17. The control system according to claim 1, wherein said burning fluctuation detecting unit detects occurrence of a misfire in said combustion chamber.

18. A control method for an in-cylinder injection internal combustion engine capable of selecting an intake stroke injection mode, in which an injection of fuel is performed primarily in an intake stroke, or a compression stroke injection mode, in which an injection of fuel is performed primarily in a compression stroke, as a fuel injection mode in accordance with a state of operation, comprising a fuel injection valve for directly injecting fuel into a combustion chamber of said internal combustion engine, a spark plug arranged in said combustion chamber to ignite an air-fuel mixture in said combustion chamber, an exhaust gas recirculation system for recirculating a portion of exhaust gas of said internal combustion engine to an intake system of said internal combustion engine; burning fluctuation detecting unit for detecting a fluctuated state of burning in said internal combustion engine, fuel injection timing control unit for controlling a fuel injection timing of said fuel injection valve, ignition timing control unit for controlling an ignition timing of said spark plug, and exhaust gas recirculation rate control unit for controlling an exhaust gas recirculation rate of said exhaust gas recirculation system, said control method comprising the following steps:

controlling a fuel injection timing of said fuel injection valve on a basis of a target fuel injection timing preset corresponding to a state of operation of said internal combustion engine during normal operation of said internal combustion engine;

controlling an ignition timing of said spark plug on a basis of a target ignition timing preset corresponding to a state of operation of said internal combustion engine during normal operation of said internal combustion engine;

controlling an exhaust gas recirculation rate of said exhaust gas recirculation system on a basis of a target exhaust gas recirculation rate preset corresponding to a state of operation of said internal combustion engine during normal operation of said internal combustion engine; and correcting at least one of said fuel injection timing, said ignition timing and said exhaust gas recirculation rate in accordance with results of a detection by said burning fluctuation detecting unit during said compression stroke injection mode.

19. The control method according to claim 18, wherein said burning fluctuations reducing step comprises correcting at least said ignition timing and said exhaust gas recirculation rate in accordance with results of a detection by said burning fluctuation detecting unit so that burning fluctuations are reduced.

20. The control method according to claim 18, wherein said burning fluctuations reducing step comprises correcting at least said fuel injection timing and said exhaust gas recirculation rate in accordance with results of a detection by said burning fluctuation detecting unit so that burning fluctuations are reduced.

21. The control method according to claim 18, wherein said burning fluctuations reducing step comprises correcting at least said fuel injection timing and said ignition timing in accordance with results of a detection by said burning fluctuation detecting unit so that burning fluctuations are reduced.

22. The control method according to claim 18, wherein said burning fluctuations reducing step comprises correcting said fuel injection timing, said ignition timing and said exhaust gas recirculation rate in accordance with results of a detection by said burning fluctuation detecting unit so that burning fluctuations are reduced.

23. The control method according to claim 18, wherein said burning fluctuations reducing step comprises retarding said fuel injection timing by a first predetermined angle so that burning fluctuations are reduced.

24. The control method according to claim 18, wherein said burning fluctuations reducing step comprises retarding said ignition timing by a second predetermined angle so that burning fluctuations are reduced.

25. The control method according to claim 18, wherein said burning fluctuations reducing step comprises decreasing said exhaust gas recirculation rate by a predetermined amount so that burning fluctuations are reduced.

26. The control method according to claim 18, wherein said control method further comprises a step in which, when said burning fluctuations are not reduced despite the performance of said burning fluctuations reducing step, said fuel injection mode is switched from said compression stroke injection mode to said intake stroke injection mode.

27. The control method according to claim 18, wherein said internal combustion engine further comprises air/fuel ratio control unit for controlling operation of said fuel injection valve on a basis of a preset target air/fuel ratio; and during said intake stroke injection mode, said burning fluctuations reducing step corrects said target air/fuel ratio in accordance with results of a detection by said burning fluctuation detecting unit.

28. The control method according to claim 18, wherein said target fuel injection timing and said target ignition timing are set at or in a vicinity of timings where a best gas mileage of said internal combustion engine is available.

29. The control method according to claim 21, wherein a correction value of said fuel injection timing and a correction value of said ignition timing are set at substantially the same angle.

30. The control method according to claim 23, wherein said first predetermined angle is set corresponding to a state of operation of said internal combustion engine.

31. The control method according to claim 24, wherein said second predetermined angle is set corresponding to a state of operation of said internal combustion engine.

32. The control method according to claim 25, wherein said predetermined amount upon decreasing said exhaust gas recirculation rate is set corresponding to a state of operation of said internal combustion engine.

33. The control method according to claim 21, wherein said internal combustion engine is provided with plural cylinders; and said burning fluctuations reducing step comprises performing said corrections of said fuel ignition timing and said ignition timing with respect to each of said cylinders.

34. The control method according to claim 18, wherein said burning fluctuation detecting unit detects occurrence of a misfire in said combustion chamber.

* * * * *